United States Patent
Kirchner et al.

(10) Patent No.: US 12,000,946 B2
(45) Date of Patent: Jun. 4, 2024

(54) SYSTEM AND METHOD FOR MAINTAINING COOPERATIVE PRECISION NAVIGATION AND TIMING (PNT) ACROSS NETWORKED PLATFORMS IN CONTESTED ENVIRONMENTS

(71) Applicant: Rockwell Collins, Inc., Cedar Rapids, IA (US)

(72) Inventors: William T. Kirchner, Ashburn, VA (US); Ramachandra J. Sattigeri, Ashburn, VA (US); Vladislav Gavrilets, McLean, VA (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 477 days.

(21) Appl. No.: 17/320,707

(22) Filed: May 14, 2021

(65) Prior Publication Data
US 2022/0365165 A1 Nov. 17, 2022

(51) Int. Cl.
*G01S 5/00* (2006.01)
*G01S 5/02* (2010.01)
*G01S 19/47* (2010.01)
*H04B 7/185* (2006.01)
*H04W 4/02* (2018.01)
*H04W 76/10* (2018.01)

(52) U.S. Cl.
CPC ............ *G01S 5/0284* (2013.01); *G01S 19/47* (2013.01); *H04B 7/18506* (2013.01); *H04W 4/023* (2013.01); *H04W 76/10* (2018.02)

(58) Field of Classification Search
None
See application file for complete search history.

(56) References Cited

U.S. PATENT DOCUMENTS

| | | |
|---|---|---|
| 8,159,397 B2 | 4/2012 | Feller et al. |
| 8,990,002 B1 | 3/2015 | Leonard |
| 9,596,073 B1 | 3/2017 | Reyes et al. |
| 9,766,339 B2 * | 9/2017 | Robinson ............... G01S 13/74 |
| 10,216,265 B1 | 2/2019 | Kirchner et al. |

(Continued)

OTHER PUBLICATIONS

Maybeck, Peter S., Stochastic models, estimation and control, Chapter 1 Introduction, Dec. 25, 1999, 19 pages.

*Primary Examiner* — Truc M Do
(74) *Attorney, Agent, or Firm* — Suiter Swantz IP

(57) ABSTRACT

A system and method established and maintains precision relative position, navigation, and timing (PNT) across a network of at least four mutually connected mobile platforms. In embodiments, a key (e.g., advantaged, absolute positioning capable) node of the network determines its pressure altitude and inertial state relative to its platform reference frame and receives inertial state and pressure altitude data from each neighboring node (in exchange for its own) to estimate the relative position and orientation of each neighbor node in its platform frame. The key node performs ranging to each neighboring node, and the neighboring nodes additionally range between each other and exchange ranging data with the key node. By correcting position and orientation estimates via ranging data, the key node determines and maintains extended relative PNT (e.g., in GPS-denied areas), which relative PNT solution is distributed across all network nodes.

15 Claims, 10 Drawing Sheets

(56) References Cited

U.S. PATENT DOCUMENTS

| | | | |
|---|---|---|---|
| 10,719,076 B1 | 7/2020 | Gavrilets et al. | |
| 11,709,273 B2 * | 7/2023 | Kocer | G01S 13/325 |
| | | | 342/357.29 |
| 2013/0293414 A1 * | 11/2013 | Robinson | G01S 19/08 |
| | | | 342/357.42 |
| 2020/0386551 A1 * | 12/2020 | Gavrilets | G08G 5/0008 |
| 2021/0254979 A1 * | 8/2021 | Faragher | G01C 21/20 |

* cited by examiner

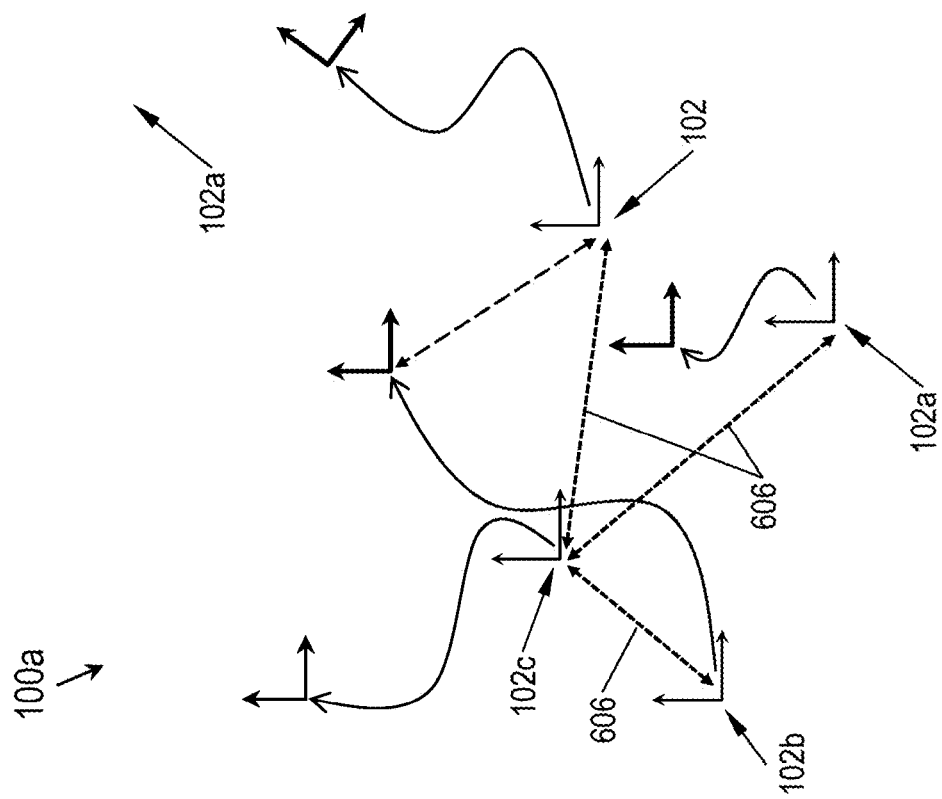
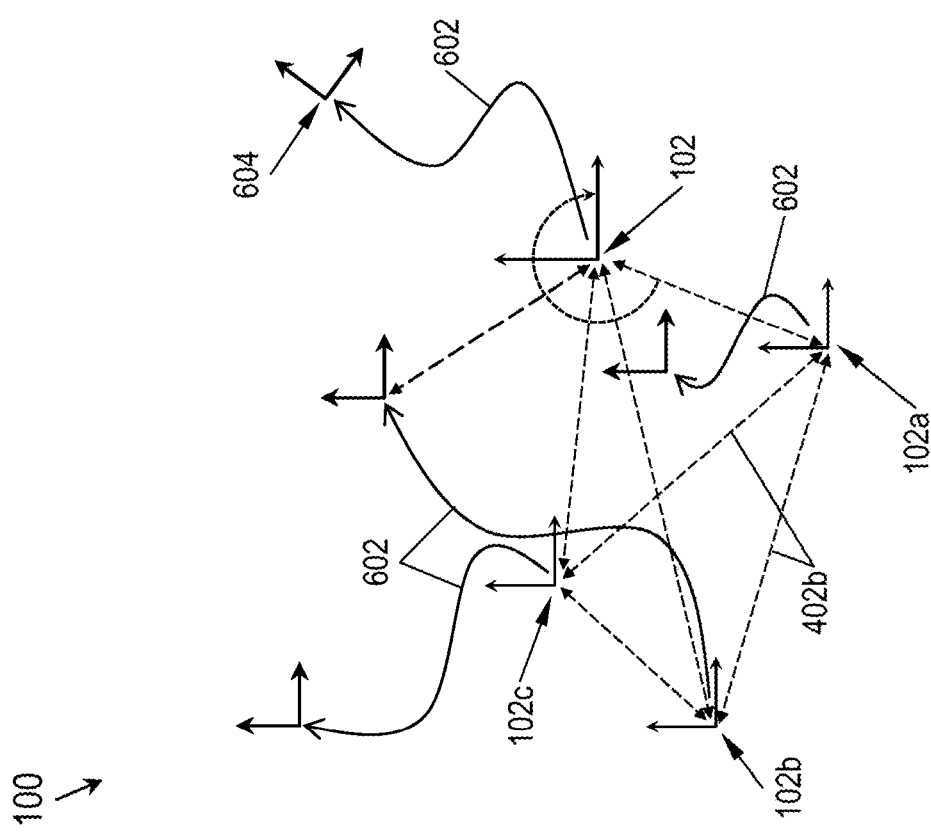
FIG. 6B
FIG. 6A

SYSTEM AND METHOD FOR MAINTAINING COOPERATIVE PRECISION NAVIGATION AND TIMING (PNT) ACROSS NETWORKED PLATFORMS IN CONTESTED ENVIRONMENTS

BACKGROUND

When operating in contested environments, there is a need to maintain precise absolute and/or relative position, navigation, and timing (PNT) among a network of mobile nodes (e.g., swarms of unmanned aircraft systems (UAS) or groups of airborne/ground-based/water-based mobile platforms). However, in "GPS-denied" areas, absolute positioning via satellite-based navigation (e.g., GPS, GLONASS, Beidou, Galileo) may not be reliably accessible for prolonged periods of time. Conventional solutions may utilize Link-16 relative navigation (RelNav) functionality. However, Link16 RelNav navigational solutions may be formulated in an absolute navigation frame (e.g., global reference frame) and therefore may require multiple advantaged nodes (e.g., nodes with absolute positioning capacity) to sufficiently constrain a RelNav solution in six degrees of freedom (6DOF). For example, compact unmanned aircraft launched from a larger platform for prosecution of high value targets may themselves be low-cost attritable aircraft for which expensive high-power/anti-jamming satellite-based receivers are not justified by size, weight, power, and cost (SWaP-C) considerations.

SUMMARY

A mobile node (e.g., unmanned aircraft system or other mobile platform) of a network of at least four mutually connected mobile nodes is disclosed. In embodiments, the node is a key node, e.g., an advantaged node incorporating an absolute position receiver capable of determining an absolute position, navigation, and timing (PNT) solution of the node. The node includes a barometric altimeter for determining a pressure altitude of the node, and an inertial measurement unit (IMU) for determining an inertial state of the node (e.g., 6DoF) in an inertial reference frame. The node includes a network radio for maintaining a data link to the other neighbor nodes of the network. In embodiments, the node receives and processes the inertial state and pressure altitude from onboard sensors at a time of validity (TOV). The key node periodically receives inertial state and altitude data from each neighbor node to generate a precision relative PNT solution in the platform reference frame of the key node.

In some embodiments, the key node and neighbor nodes include mobile platforms (manned or unmanned aircraft, ground-based or water-based vehicles).

In some embodiments, the key node distributes among the neighbor nodes of the network the relative precision PNT solution as well as the sensed inertial state data, pressure altitude data, and primary ranging data.

In some embodiments, the key node receives additional absolute PNT data from a source external to the network and refines the precision relative PNT solution into an absolute PNT solution fixing the network in a global reference frame, which the key node may distribute to the other neighbor nodes of the network.

In some embodiments, the key node includes additional resilient sensors for generating auxiliary sensor data capable of enhancing the accuracy of the relative PNT solution. For example, resilient sensors may include: electrooptical (EO) sensors for determining a bearing between the key node and a neighbor node; line of sight (LOS) sensors for determining a LOS angle from the key node to a neighbor node; magnetometers, and/or air data sensors.

In some embodiment, absolute PNT is assumed for at least two nodes within the network (e.g., at least one node in addition to the key node). For example, a relative bearing between the key node and a neighbor node may be based on an absolute PNT of the neighbor node. Assuming absolute PNT for at least two nodes of the network, the relative PNT solution may be refined to an absolute PNT solution fixing the network to a global reference frame, which the key node may distribute throughout the network.

In some embodiments, the relative PNT solution based on shared inertial state and pressure altitude may be refined via ranging data. For example, the key node generates primary ranging data relative to each neighbor node via either one-way pseudoranging (e.g., based on timing signals received from the neighbor node) or two-way time transfer (TWIT) ranging operations performed at the TOV between the key node and a neighbor node Similarly, the key node exchanges the primary ranging data for secondary ranging data received from the neighboring nodes, the secondary ranging date corresponding to ranging operations between pairs of the neighboring nodes. The relative PNT solution is refined based on the primary and secondary ranging data.

In some embodiments, the key node receives secondary ranging data from (and transmits primary ranging data to) the neighbor nodes at a slower data rate relative to the faster data rate at which the key node receives inertial state data and/or pressure altitude data from the neighbor nodes.

In some embodiments, the absolute position receiver is a satellite-based position receiver configured to determine absolute PNT based on received satellite navigational signals.

In some embodiments, the primary and secondary ranging data is selected from one-way pseudoranging based on timing signals transmitted by a neighbor node and received by the key node, and two-way time transfer (TWIT) ranging operations mutually conducted between the key node and the neighbor node.

In a further aspect, a method for maintaining relative precision PNT data across a network of at least four mobile platforms is also disclosed. In embodiments, the method includes determining, via positional sensors of an advantaged mobile platform (e.g., wherein the positional sensors include absolute as well as relative positioning sensors) inertial state data of the key mobile platform in its own platform reference frame. The method includes determining a pressure altitude of the key mobile platform via onboard barometric altimeter. The method includes receiving remote inertial state and pressure altitude data from each of the (N−1) neighbor mobile platforms (e.g., each in the platform reference frame of the sending platform and corresponding to a time of validity (TOV)). The method includes generating a relative PNT solution positioning the N mobile platforms relative to each other based on the shared remote inertial state and pressure altitude data. The method includes forwarding the inertial state and pressure altitude data of the key mobile platform to the (N−1) neighbor mobile platforms. The method includes determining ranging data (e.g., either one-way pseudoranging based on receiving timing signals, or two-way time transfer (TWIT)) between the key mobile platform and a neighbor mobile platform. The method includes receiving ranging data at the key mobile platform. The method includes refining the relative PNT solution based on the sensed and received ranging data. The method includes forwarding the refined relative PNT solution to the (N−1) neighbor mobile platforms.

In some embodiments, the method includes determining (or receiving) ranging data via two-way time transfer (TWIT) mutually performed between the key mobile node and the neighbor mobile platform (or between a pair of neighbor mobile nodes).

In some embodiments, the method includes exchanging inertial state and pressure altitude data with the neighbor mobile nodes at a relatively high data rate and exchanging ranging data with the neighbor mobile nodes (e.g., and refining the relative PNT solution based on the ranging data) at a lower data rate.

In some embodiments, wherein the key mobile platform is an advantaged platform including absolute positioning sensors, and the relative PNT solution is based on absolute position data of the key mobile platform, the method includes receiving secondary absolute position data, e.g., from a neighboring mobile platform or a source external to the network, and refining the relative PNT solution to an absolute PNT solution fixing the key mobile platform and neighbor mobile platforms of the network in a global reference frame.

In some embodiments, the method includes receiving additional or auxiliary sensor data via onboard resilient sensors of the key mobile platform, and further updating the relative PNT solution based on the auxiliary sensor data.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 6A and 6B are diagrammatic illustrations of the effect of additional absolute position, navigation, and timing (PNT) data within the network of FIG. 1;

DETAILED DESCRIPTION

Figure 1:
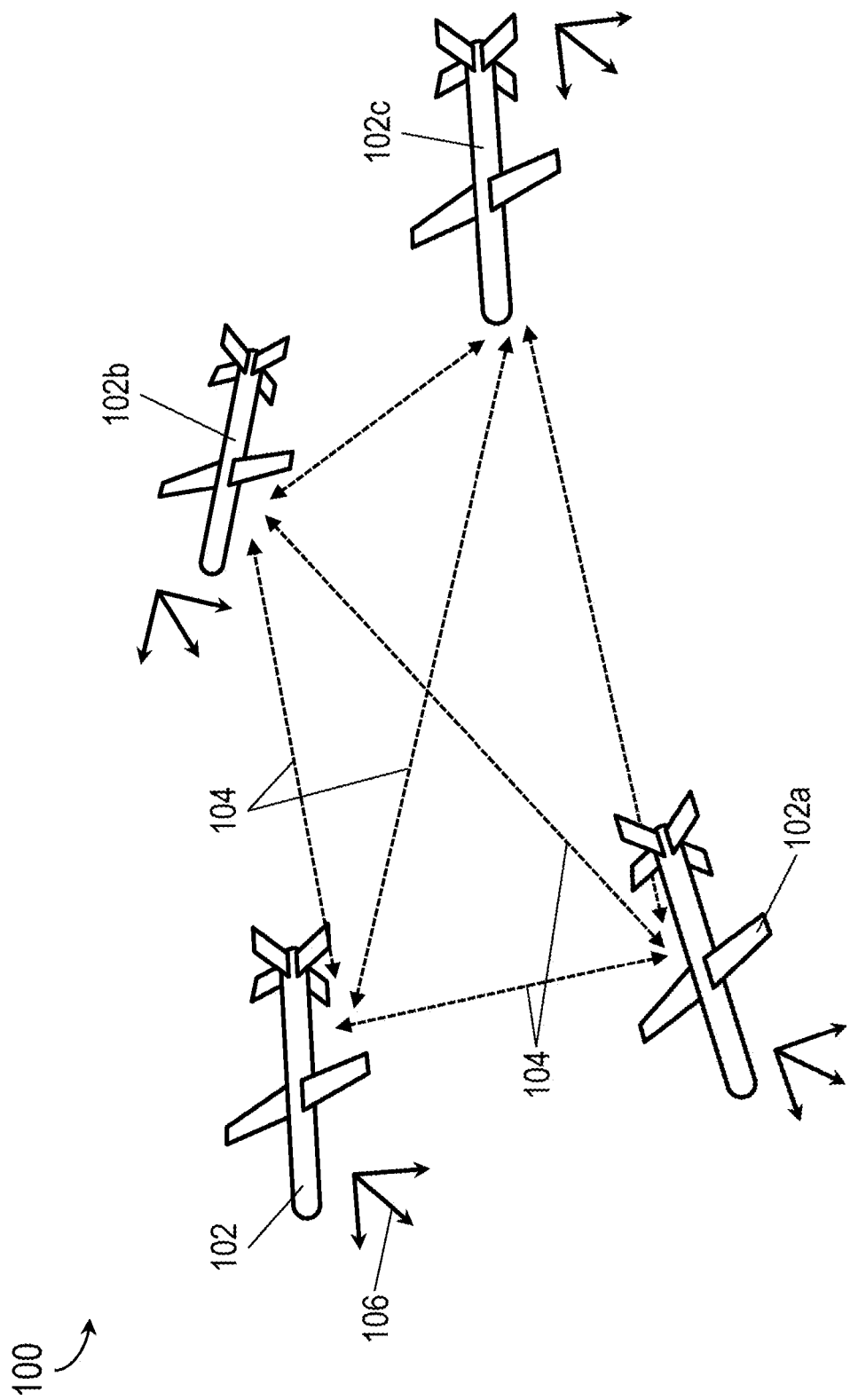
FIG. 1 illustrates a network of mutually connected mobile platforms according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for solving the problem of precision relative position, navigation, and timing (PNT) in GPS-denied environments by utilizing pseudoranging via two-way time transfer (TWIT). Given enough interconnected mobile platforms exchanging TWIT-based pseudoranging as well as relative position and orientation (pose) estimates relative to the other platforms, relative precision PNT in six degrees of freedom (6DOF) can be maintained for extended periods of time through GPS-denied or other contested environments (e.g., Anti-Access/Anti-Denial (A2AD) environments presented by a near peer adversary). The capacity to maintain relative precision PNT over time in contested environments may in turn allow expanded alternative PNT concepts of operations (CONOPS) and enhanced prosecution of high-value targets through said environments. For example, a swarm or cloud of independent unmanned aircraft systems (e.g., as well as any personnel, equipment, or weapons incorporated thereby) may operate as a single, large-scale distributed mobile platform maintaining an integrated surveillance and navigation solution.

Referring to FIG. 1, a network 100 of mobile platforms 102, 102a-c is disclosed.

In embodiments, the network 100 may include at least four mobile platforms 102, 102a-c (e.g., nodes, mobile nodes), each mobile platform incorporating radio hardware and software for maintaining high-rate data links 104 to each of its neighboring mobile platforms. For example, the network 100 may include a swarm or cloud of at least four manned or unmanned aircraft (e.g., unmanned aircraft systems (UAS)) operating independently or in concert and moving relative to each other. In some embodiments, as described in greater detail below, the member mobile platforms 102, 102a-c of the network 100 may incorporate a mix of airborne, ground-based, and water-based vehicles or mobile platforms. Similarly, individual mobile platforms 102, 102a-c may enter or leave the network 100 at any time, e.g., as rules of engagement permit or demand.

In embodiments, each of the mobile platforms 102, 102a-c may be comparably equipped, although one or more mobile platforms may be more robustly configured than others. For example, as disclosed in greater detail below, each mobile platform 102, 102a-c may be configured for absolute position, navigation, and timing (PNT) in a global reference frame via satellite-based navigation systems or position receivers (e.g., GNSS, GPS). However, in GPS-denied environments one or more mobile platforms 102, 102a-c may not be capable of receiving satellite-based positioning signals for extended periods of time. It is contemplated that the network 100 may include at least one, but maybe no more than one, key mobile platform 102 (e.g., key node, advantaged node) with robust absolute PNT capacity relative to its neighboring mobile platforms 102a-c. Any of the mobile platforms 102, 102a-c may be capable of operating as a key or advantaged node relative to the other mobile platforms within the network 100. For example, as the network 100 and the individual mobile platforms 102, 102a-c move into new areas under changing operating conditions, the mobile platforms within the network capable of operating as a key or advantaged node may shift multiple times. Similarly, if two or more mobile platforms 102, 102a-c of the network are able to operate as advantaged nodes, the precision PNT generated thereby may be absolute rather than relative PNT, e.g., based in a global (e.g., earth-centered earth-fixed (ECEF)) frame rather than a platform reference frame 106.

Accordingly, each mobile platform 102, 102a-c may further incorporate inertial measurement units (IMU) and barometric altimeters capable of maintaining a relative state of the mobile platform as well as a relative altitude of the mobile platform based on sensed atmospheric pressure. For example, each mobile platform 102, 102a-c may incorporate one or more IMUs operating in six degrees of freedom (6DOF), e.g., comprising a collection of inertial sensors (e.g., accelerometers, gyroscopes, magnetometers) for estimating or projecting (e.g., in an inertial reference frame) changes in position (e.g., translations along pitch (x), roll (y), and yaw (z) axes) and changes in orientation (e.g., rotations relative to the pitch, roll, and yaw axes) and refining estimated or projected states based on actual measurements (and, e.g., a likely error covariance) to minimize noise or drift inherent to the sensors. For example, correction of inertial head pose data via numerically stable Kalman filtering in head-tracking implementations is discussed in U.S. Pat. No. 10,216,265, which is herein incorporated by reference in its entirety.

In embodiments, each mobile platform 102, 102a-c may determine its own inertial state data relative to its own platform reference frame 106 and distribute its own inertial state data and barometric altitude to its neighboring mobile platforms via data link 104 (e.g., ideally 50 Hz or greater). Further, the key or advantaged mobile platform 102 may refine and correct the inertial states and altitude data for itself and its neighbor mobile platforms 102a-c by ranging each mobile platform relative to its neighbors within the network 100.

In embodiments, the key mobile platform 102 may refine inertial states and altitude data via pseudoranging. For example, the key mobile platform 102 may receive timing signals from one or more of the neighbor mobile platforms 102a-c, each timing signal associated with a known relative time and enabling the key mobile platform 102 to determine a pseudorange to the transmitting neighbor mobile platform (e.g., based on the time difference between transmission and reception of the timing signal and the speed of light). In some embodiments, the key mobile platform 102 may perform bi-directional ranging via two-way time transfer (TWIT) between the key mobile platform and a neighbor mobile node 102a-c. Accordingly, the key mobile platform 102 may generate a relative precise PNT solution relative to its own reference frame (but, e.g., based on the last known absolute position of the key mobile platform) and distribute this solution to its neighboring mobile platforms 102a-c, which platforms may in turn refine the received solution relative to their own platform reference frames 106.

In embodiments, generated and distributed relative precise PNT solutions may be used to coordinate the relative positions of the mobile platforms 102, 102a-c within the network 100 not just in real time (e.g., relative to a TOV), but historically. For example, via postprocessing or filtering backward in time, the positions and orientations of each mobile platform 102, 102a-c may be determined at past times of validity associated with target observations.

In other embodiments, the ranging to or between other mobile platforms or nodes may be established by one-way timing signals and a mix of TWIT and one-way timing signals. In some cases, a node may receive the higher bandwidth (and more observable) timing signals, but return measurement data at a lower bandwidth, indirectly through another asset, or delayed after leaving a critical area. An example illustrating this scenario is as follows: a low-observability drone flies low in radio silence while high flying UAVs maintain a relative navigation solution and send out one way timing signals. The radio-silent drone receives and records the timing signals and observes an enemy surface to air missile (SAM) site. The low-observability drone then climbs to a safe altitude some distance away from the SAM site and transmits the measurements or location derived from the measurements to a UAV, which fires a missile at the SAM site using the relative navigation solution.

Figure 2A:
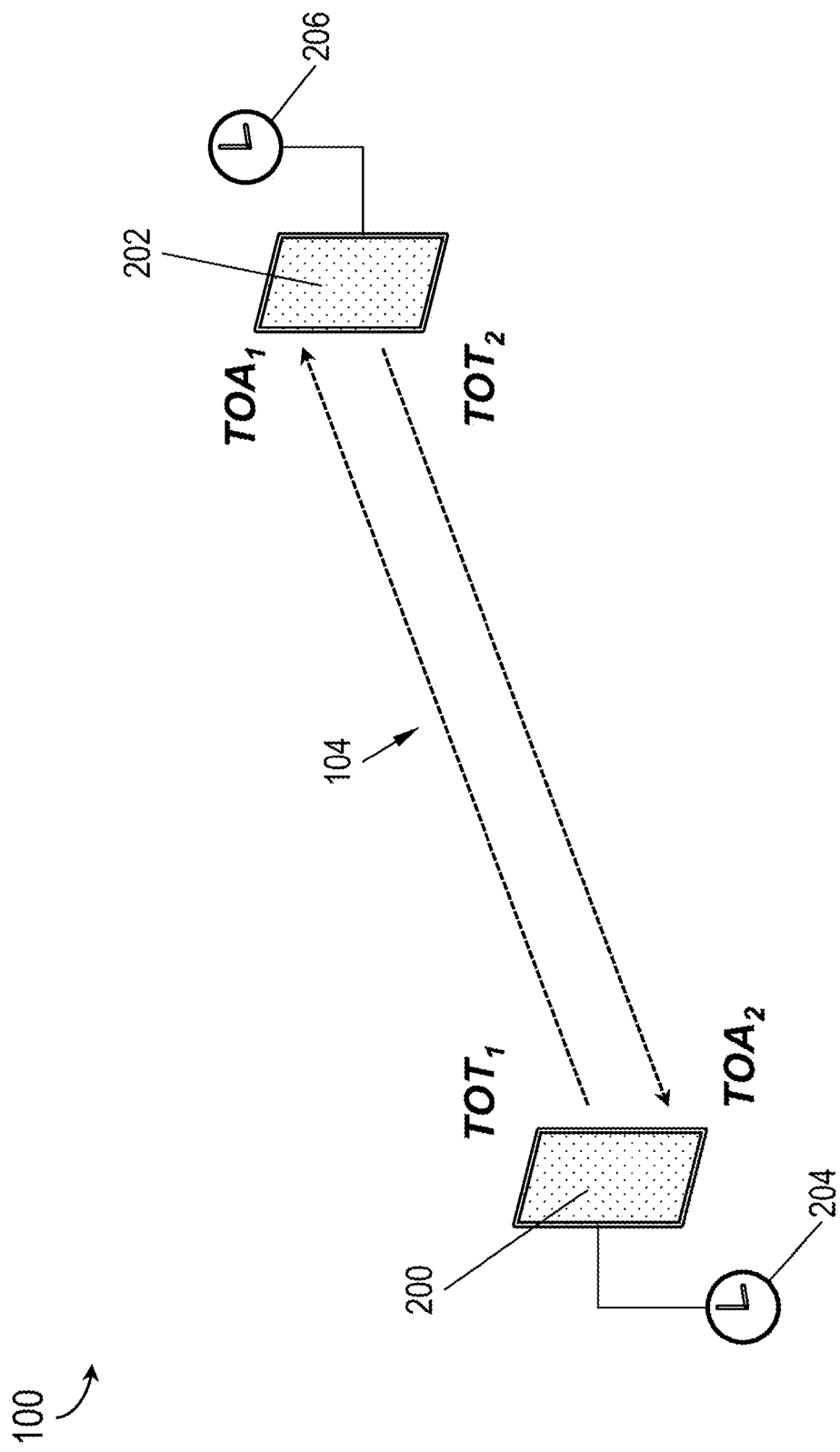
FIGS. 2A through 2C are diagrammatic illustrations of two-way time transfer (TWIT) ranging operations within the network of FIG. 1.

Referring also to FIG. 2A, the network 100 is disclosed. The network 100 may include ranging radios 200, 202.

In embodiments, the ranging radios 200, 202 may be implemented aboard any two mobile platforms (102, 102a-c; FIG. 1) of the network 100. For example, the ranging radios 200, 202 may determine a radio frequency (RF) range between the two ranging radios (e.g., and accordingly between their respective mobile platforms 102, 102*a-c*). The determined RF range may be more accurate and more effective than unidirectional time of flight (ToF) measurement by mitigating synchronization errors between the respective clocks 204, 206 of the ranging radios 200, 202. For example, each ranging radio 200 may estimate time, frequency, and phase offsets of transferred packets measured by its own time clock 204 as well as by the time clock 206 of its counterpart ranging radio 202. An example precision time and frequency estimator is disclosed by U.S. Pat. No. 9,596,073, which is herein incorporated by reference in its entirety.

In embodiments, the ranging radio 200 may transmit one or more data packets via data link 104 to the counterpart ranging radio 202 at a time of transmission ($TOT_1$) measured by its own time clock 204. The data packets may be received by the ranging radio 202 at a time of arrival ($TOA_1$) measured by its time clock 206. At a subsequent time of transmission ($TOT_2$) also measured by the time clock 206, the ranging radio 202 may transmit data packets back to the ranging radio 200, which receives the transmitted packets at a time of arrival ($TOA_2$) measured by its time clock 204. Accordingly, the time $\Delta t_A = TOA_2 - TOT_1$ may be the time between send/receive measured by the time clock 204 of the ranging radio 200, and the time $\Delta t_B = TOT_2 - TOA_1$ may be the corresponding time between send/receive measured by the time clock 206 of the ranging radio 202. The RF range between the ranging radios 200, 202 may thus be expressed in geometric pseudorange as (where constant c=speed of light):

$$= \frac{c}{2}[(TOA_1 - TOT_1) + (TOA_2 - TOT_2)]$$
$$= \frac{c}{2}[(TOA_2 - TOT_1) + (TOT_2 - TOA_1)]$$
$$= \frac{c}{2}[\Delta t_A - \Delta t_B]$$

where the RF range is associated with a time of validity (TOV) corresponding to a particular geometric configuration (e.g., relative position and orientation) of the mobile platforms 102, 102*a-c* (see, e.g., FIG. 1).

Figure 2B:
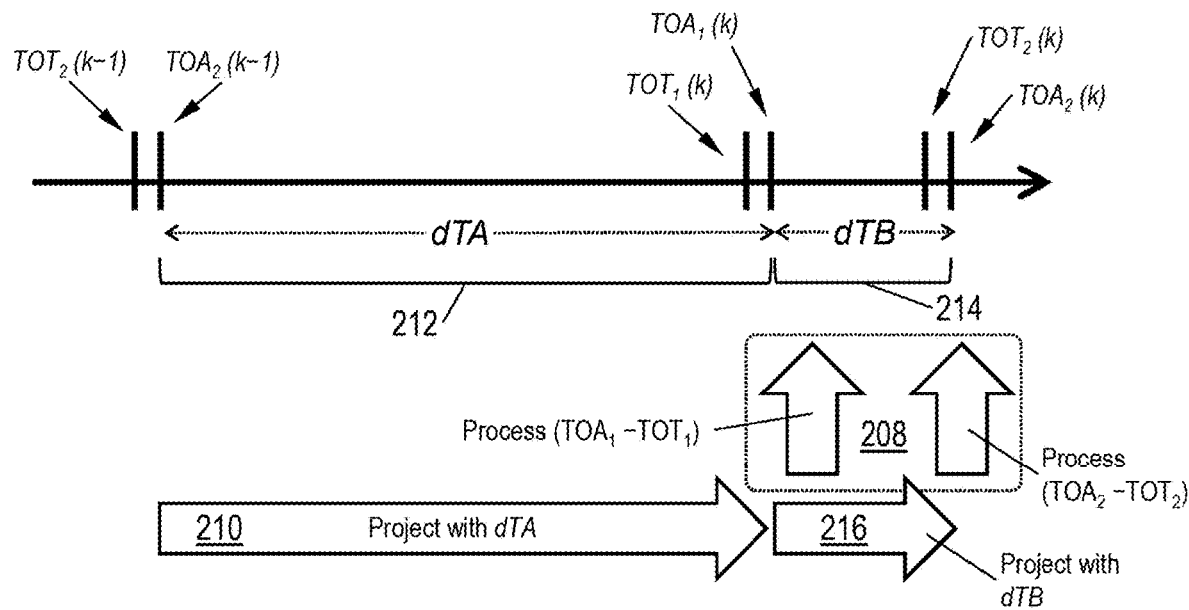

Referring to FIG. 2B, in embodiments a model for two-way timing and ranging (TWTR) may be based on a time-series of two-way ranging sequences (e.g., iterations, times of validity (TOV)), each sequence including a "ping" message (e.g., $TOT_1$, $TOA_1$) followed by a "reply" message (e.g., $TOT_2$, $TOA_2$). Following the timing sequence, the radios 200, 202 may exchange TOT and TOA data. In embodiments, TWTR processing 208 (e.g., for sequence or TOV k) may propagate (210) a state estimate from the previous sequence k−1 across the time interval dTA (212), and may propagate (214) a state estimate accounting for the (shorter) time difference dTB (216) between ping and reply messages.

Figure 2C:
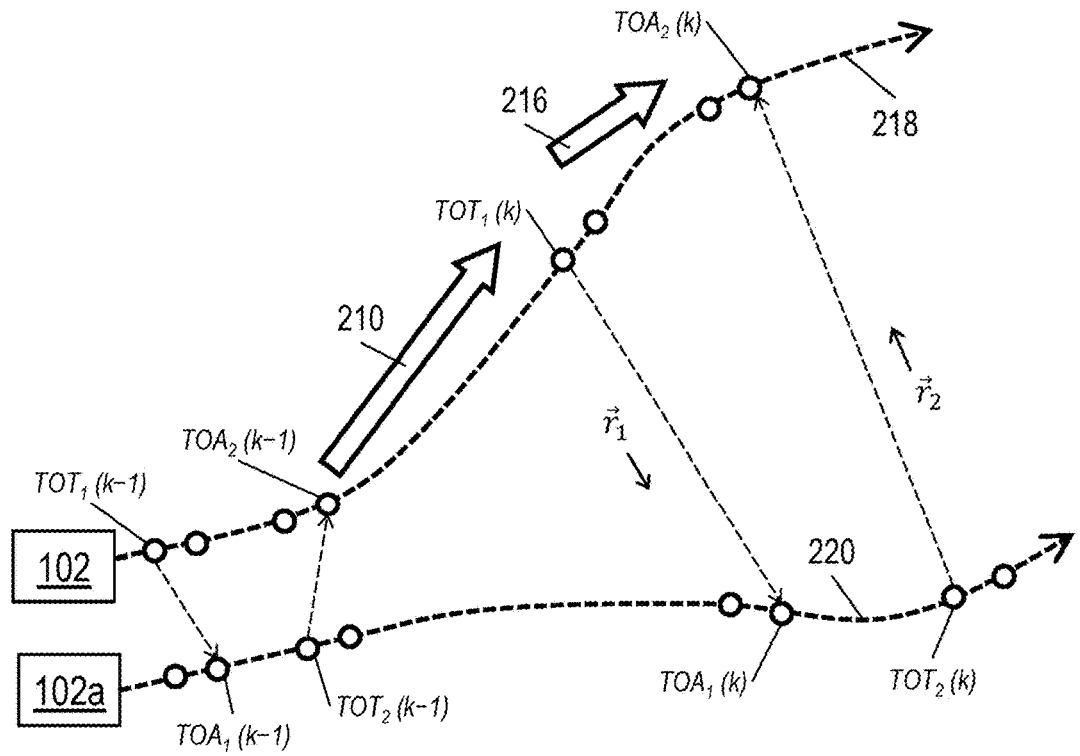

Referring also to FIG. 2C, in embodiments TOT and TOA data may be used along with other onboard sensors (e.g., as described in greater detail below) to update the local state vectors $\vec{r}_1$, $\vec{r}_2$ between mobile platforms 102, 102*a* with respective trajectories 218, 220. For example, dynamic compensation may adjust for the relative motion of mobile platforms 102, 102*a* based on local sensor updates from each mobile platform.

Figure 3:
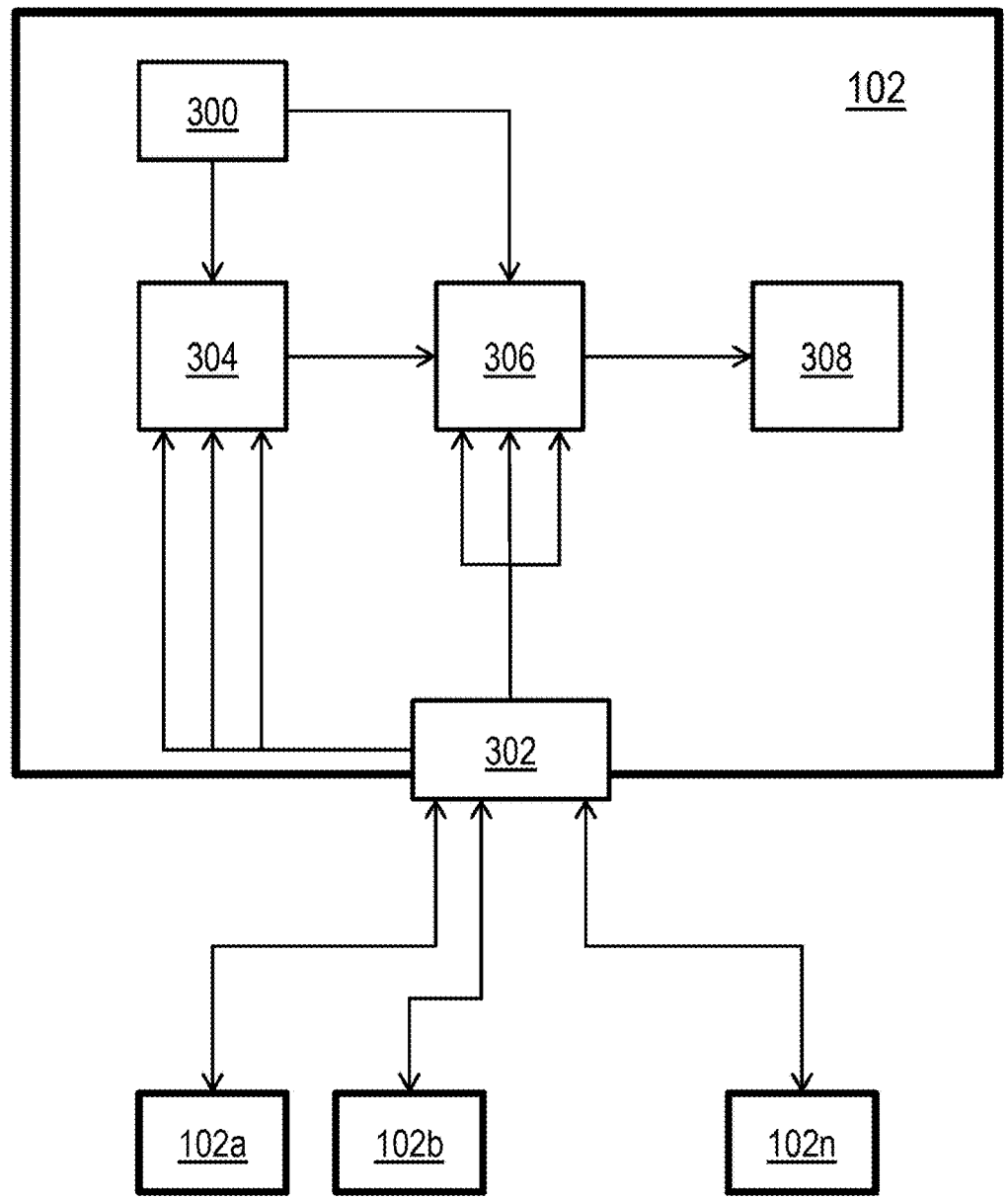
FIG. 3 is a block diagram illustrating system components of the network of FIG. 1 and its member mobile platforms.

Referring now to FIG. 3, the network 100 is shown.

In embodiments, the key mobile platform 102 (as well as its neighboring (N−1) mobile platforms 102*a*, 102*b*, ... 102*n*, where N≥4) may include onboard sensors 300. Control processors aboard the mobile platform 102 may include datalink processing 302 (e.g., radio hardware/software, antenna elements, signal processing for maintaining data links 104 between mobile platforms), relative strapdown processing 304 of high-rate inertial states, relative measurement processing 306 of barometric/pressure altitude data and ranging (pseudoranging/TWIT), and cooperative mission processing 308 (e.g., targeting, mapping) based on the resulting relative precision PNT navigational solutions.

In embodiments, onboard sensors 300 may include absolute positioning sensors, e.g., satellite-based positioning receivers (e.g., GNSS, GPS) for determining an absolute position of the mobile platform 102 based on received satellite positioning signals. Onboard sensors 300 may further include inertial measurement units (IMU) for determining the current inertial state (e.g., relative position/velocity/attitude (PVA)) of the mobile platform 102 at a given time of validity (TOV). Onboard sensors 300 may further include a barometric altimeter for determining a pressure altitude of the mobile platform 102 at the TOV.

In some embodiments, the onboard sensors 300 may include additional resilient sensors configured to further enhance accuracy by generating auxiliary sensor data which may be utilized by relative measurement processing 306 to refine relative PNT navigational solutions. For example, the mobile platform 102 may include magnetometers or air data sensors for generating additional or auxiliary positional information (e.g., airspeed, angle of attack, altitude). Additionally, or alternatively, the onboard sensors 300 may include electrooptical (EO), infrared (IR), and/or line-of-sight (LOS) sensors for determining a bearing angle from a neighboring mobile platform 102*a-n* to the mobile platform 102. In some embodiments, onboard sensors 300 include passive RF sensors for ranging or targeting via, e.g., time difference of arrival (TDoA), frequency difference of arrival (FDoA), angle of arrival (AoA) with respect to received timing signals.

In embodiments, datalink processing 302 may manage asynchronous reception and processing of inertial state, altitude, and ranging data received from neighboring mobile platforms 102*a-n* via the data links 104. For example, relative strapdown processing 304 may receive updated inertial state data from the onboard sensors 300 (as well as updated inertial state data from the mobile platforms 102*a-n*, via the data links 104) at a relatively high data rate (e.g., 50 Hz) compared to a lower rate (e.g., −1 Hz) at which ranging and pressure altitude data may be received by relative measurement processing 306, which may be received and processed at a comparatively lower rate. Similarly, datalink processing 302 may be responsible for distributing inertial state data, altitude data, and ranging data of the mobile platform 102 to the neighboring mobile platforms 102*a-n* so that similar processing may be performed aboard each node of the network 100.

Accordingly, in embodiments relative strapdown processing 304 aboard each mobile platform 102, 102*a-n* may estimate the relative position and orientation of each neighboring mobile platform in its own platform reference frame (106) based on high-rate inertial state data received from the neighboring mobile platforms. In embodiments, the estimated relative inertial state data (310) may be periodically corrected by relative measurement processing 306. For example, relative measurement processing 306 may correct or refine the relative inertial state data 310 (as described in greater detail below) based on lower-rate ranging and altitude data as it is received from the neighboring mobile platforms 102a-n. The resulting precise relative PNT navigation solution (312) may be forwarded to cooperative mission processing 308 and distributed to each neighboring mobile platform 102a-n via datalink processing 302.

In embodiments, the onboard sensors 300 may incorporate a variety of error models. For example, the time clock (206, FIG. 2A) of the ranging radio (200, FIG. 2A) may incorporate an error model for precision oscillators, e.g., a standard 3-state model wherein the phase, frequency, and drift of the time clock are included with random walk processes and the respective deviations r(t), f(t), and p(t) from true drift, frequency, and phase may be expressed as:

$$r(t) = r(t-1) + \alpha(t)$$

$$f(t) = f(t-1) + r(t-1)\Delta t + \eta(t)$$

$$p(t) = p(t-1) + f(t-1)\Delta t + \frac{1}{2}r(t-1)\frac{\Delta t^2}{2} + \varepsilon(t)$$

where $\alpha(t)$, $\eta(t)$, and $E(t)$ are independent zero mean white noise processes and $\Delta t$ is a time interval between updates.

In embodiments, relative barometric or pressure altitude between two mobile platforms i, j (102, 102a; FIG. 1) of the network 100 may be expressed as:

$$z_{i/j}^{i,relBaro} = \tilde{h}_j - \tilde{h}_i = h_j + v_j^{baro} - h_i - v_i^{baro}$$

$$= z_{i/j}^{i,relBaro} + v_{i/j}^{baro}$$

where $z_{i/j}^{i,relBaro}$ represents an idealized altitude difference between the two mobile platforms 102, 102a and $v_{i/j}^{baro}$ represents error due to the barometric measurements of each mobile platform. Further, an error model for relative barometric altitude measurement in terms of the relative error states maintained by the key mobile platform i (102) may be given as:

$$\delta z_{i/j}^{i,relBaro} = \tilde{z}_{i/j}^{i,relBaro} - \hat{z}_{i/j}^{i,relBaro} \approx \hat{C}_{pi}^{ned}(3,:)\delta \hat{r}_{i/j}^i + v_{i/j}^{baro}$$

where $\hat{C}_{pi}^{ned}$ is a Direction Cosine Matrix (DCM) of the key mobile platform i relative to the local-level north, east, down (NED) reference frame.

With respect to inertial measurement units (IMU), in embodiments each mobile platform 102, 102a-c may have access to its inertial states (e.g., acceleration, angular rates) by virtue of the measurement of these inertial states by the IMU in the platform (e.g., body-fixed coordinate) reference frame. For example, these measurements may be at a relatively high data rate (e.g., ≥50 Hz) and corrupted by various errors. In embodiments, an IMU measurement model, e.g., where the mobile platform 102, 102a-c is a small unmanned aircraft system, may be expressed as:

$$\tilde{a}_{body}^{IMU}=(I_3+K_a)a_{body}^{IMU}+b_a+\eta_{acc}$$

$$\dot{b}_a=\eta_{a,bias}$$

where $\tilde{a}_{body}^{IMU}$ is the acceleration measurement along body axes, $a_{body}^{IMU}$ is the error-free idealized acceleration (unknown), $K_a$ represents a matrix of accelerometer scale factors and cross-axis sensitivity errors, $b_a$ is the accelerometer bias, and $\eta_{acc}$ and $\eta_{a,bias}$ are zero-mean white noise processes. In addition, gyroscopic (e.g., angular rate) measurements from the IMU may be expressed similarly to accelerometer measurements. For example, an angular rate measurement model may be embodied by:

$$\tilde{\omega}_{body}^{IMU}=(I_3+K_g)\omega_{body}^{IMU}+G_{acc}a_{body}^{IMU}+b_g+\eta_{gyro}$$

$$\dot{b}_g=\eta_{g,bias}$$

where an additional body-acceleration dependent error term may be expressed in terms of the G sensitivity matrix $G_{acc}$.

Relative Position Estimation

In embodiments, for a network 100 of N mutually connected (e.g., networked) mobile platforms 102, 102a-c (where N≥4), a relative position of each of the N−1 neighboring mobile platforms 102a-c may be determined relative to a "key" (e.g., advantaged) mobile platform 102, e.g., assuming TWIT ranging between each pair of mobile platforms and pressure altitude measurements at each neighboring mobile platform 102a-c communicated to the "key" mobile platform 102.

For example, each mobile platform 102, 102a-c may be associated with a position vector $$r^i (i=1,2,\ldots N)$$

such that a relative position vector from a mobile platform i to a mobile platform j within the network 100 may be denoted $$p_{ij}=r^j-r^i$$

In embodiments, TWIT measurement vectors may be converted to equivalent geometric range measurement vectors as shown above. For example, for each mobile platform i (102) within the network 100 (e.g., mobile platforms i, j, k, l corresponding to mobile platforms 102, 102a-c), the $i^{th}$ platform may be associated with the following ranging measurements for processing:

$$z_{ij}^{i,twtt} = \tilde{R}_{ij} = \|r^j - r^i\| + v_{ij}^{i,twtt} \quad (A.1.1)$$

$$= \|p_{ij}\| + v_{ij}^{i,twtt}; j = 1, 2, \ldots N, i \neq j$$

$$z_{kl}^{i,twtt} = \tilde{R}_{kl} = \|r^l - r^k\| + v_{kl}^{i,twtt} \quad (A.1.2)$$

$$= \|r^l - r^i + r^i - r^k\| + v_{kl}^{i,twtt}$$

$$= \|p_{il} - p_{ik}\| + v_{kl}^{i,twtt}; k, l = 1, 2, \ldots N; k \neq l; k \neq i; l \neq i$$

In embodiments, assuming the relative position vector is expressed in a Cartesian frame, equations A.1.1 and A.1.2 above may be expanded thusly:

$$\tilde{z}_{i,j}^{i,twtt}=\tilde{R}_{ij}=\sqrt{p_{x_{ij}}^2+p_{y_{ij}}^2+p_{z_{ij}}^2}+v_{i,j}^{i,twtt}; j=1,2,\ldots N, i\neq j \quad (A.1.3)$$

$$\tilde{z}_{kl}^{i,twtt}=\tilde{R}_{kl}=\sqrt{(p_{x_{il}}-p_{x_{ik}})^2+(p_{y_{il}}-p_{z_{ik}})^2}+v_{kl}^{i,twtt};$$

$$k,l=1,2,\ldots N; k\neq i; k\neq i; l\neq i \quad (A.1.4)$$

where $\tilde{z}_{kl}^{i,twtt}$ is the vector of ranging measurements made directly by the key mobile platform i (e.g., i-j, i-k, i-l) and $\tilde{z}_{kl}^{i,twtt}$ are ranging measurements between other pairs of neighboring mobile platforms within the network 100 (e.g., j-k, j-l, k-l). For example, given a network 100 of N mobile platforms 102, 102a-c, there may be a maximum N (N−1)/2 TWIT measurements, of which (N−1) measurements may be made directly by the mobile platform i (102).

As noted above, in embodiments each mobile platform i, j, k, l (102, 102a-c) may communicate its barometric pressure altitude measurements to the other neighboring mobile platforms. For example, the mobile platform i (102) may measure its own pressure altitude relative to the other mobile platforms j, k, l (102*a-c*) to yield a set of (N−1) relative altitude measurements:

$$\tilde{z}_{ij}^{i,relbaro} = p_{z_{ij}} + v_{ij}^{i,relbaro}; j=1,2,\ldots N; i\neq j \quad (A.1.5)$$

In embodiments, the vector of measurements available to mobile platform i (102) by considering all TWIT and relative altitude measurements may be expressed:

$$\tilde{z}_{rel}^i = \bar{h}(\bar{X}_{rel}^i) + \bar{v}^i, dim(\tilde{z}_{rel}^i) = (N+2)(N-1)/2$$

$$\bar{X}_{rel}^i = [p_{i1}, p_{i2}, \ldots p_{ij}, \ldots p_{iN}]^T; j=1,2,\ldots N; i\neq j \quad (A.1.6)$$

In embodiments, assuming a key node 1 (mobile platform i, 102), without loss of generality, equations A.1.3 through A.1.5 above may be specialized for i=1, N=4 to yield 9 measurement equations solvable for 9 relative states (e.g., relative ranging and altitude between each pair of nodes 1, 2, 3, 4 (mobile platforms i, j, k, l, 102, 102*a-c*):

$$\tilde{z}_{12}^{1,twtt} = \tilde{R}_{12} = \sqrt{p_{x_{12}}^2 + p_{y_{12}}^2 + p_{z_{12}}^2} + v_{12}^{1,twtt}$$

$$\tilde{z}_{13}^{1,twtt} = \tilde{R}_{13} = \sqrt{p_{x_{13}}^2 + p_{y_{13}}^2 + p_{z_{13}}^2} + v_{13}^{1,twtt}$$

$$\tilde{z}_{14}^{1,twtt} = \tilde{R}_{14} = \sqrt{p_{x_{14}}^2 + p_{y_{14}}^2 + p_{z_{14}}^2} + v_{14}^{1,twtt}$$

$$\tilde{z}_{23}^{1,twtt} = \tilde{R}_{23} = \sqrt{(p_{x_{13}}-p_{x_{12}})^2 + (p_{y_{13}}-p_{y_{12}})^2 + (p_{z_{13}}-p_{z_{12}})^2} + v_{23}^{1,twtt}$$

$$\tilde{z}_{24}^{1,twtt} = \tilde{R}_{24} = \sqrt{(p_{x_{14}}-p_{x_{12}})^2 + (p_{y_{14}}-p_{y_{12}})^2 + (p_{z_{14}}-p_{z_{12}})^2} + v_{24}^{1,twtt}$$

$$\tilde{z}_{34}^{1,twtt} = \tilde{R}_{34} = \sqrt{(p_{x_{14}}-p_{x_{13}})^2 + (p_{y_{14}}-p_{y_{13}})^2 + (p_{z_{14}}-p_{z_{13}})^2} + v_{34}^{1,twtt}$$

$$\tilde{z}_{12}^{i,relbaro} = h_2^{baro} - h_1^{baro} = p_{z_{12}} + v_{12}^{i,relbaro}$$

$$\tilde{z}_{13}^{i,relbaro} = h_3^{baro} - h_1^{baro} = p_{z_{13}} + v_{13}^{i,relbaro} \quad (A.1.7)$$

In embodiments, the partial derivative matrix H of the nonlinear measurement solution above must be computed for every updated guess of the solution. The matrix H may have a number of rows equal to the number of measurement equations and a number of columns equal to the dimension of unknowns. For example, in the special case where i=1 and N=4, and the measurement equations A.1.7 above, the matrix H may be an (N−1)*(N−1)×(N−1)*9 (e.g., 9×27) matrix. With respect to a standard extended Kalman filter (EKF) having standard measurement model $$z = Hx$$

and utilizing the following error models:

$$r_{y/x}^x = \hat{r}_{y/x}^x + \delta r_{y/x}^x \quad (1)$$

(e.g., for estimated relative position $\hat{r}_{y/x}^x$ and true position $r_{y/x}^x$)

$$\dot{r}_{y/x}^x = \dot{\hat{r}}_{y/x}^x + \delta \dot{r}_{y2/x}^x \quad (2)$$

$$C_x^y = \hat{C}_x^y R(\phi_{y,1}, \phi_{y,2}, \phi_{y,3}) \quad (3)$$

then $$X = [x_{12} x_{13} x_{14}]$$

for [1×(N−1)*9)] error states in *EKF* and measurements $$\tilde{z}_{12}^{1,twtt} \tilde{z}_{13}^{1,twtt} \tilde{z}_{14}^{1,twtt}$$

$$\tilde{z}_{23}^{1,twtt} \tilde{z}_{24}^{1,twtt} \tilde{z}_{34}^{1,twtt}$$

$$\tilde{z}_{12}^{i,relbaro} \tilde{z}_{13}^{i,relbaro} \tilde{z}_{14}^{i,relbaro}.$$

The measurement model H may be sparse, so for nonzero terms:

$$H(1,1:3) = \frac{\partial \tilde{z}_{12}^{1,twtt}}{\partial \bar{X}_{rel}^i} = \left[\frac{p_{x_{12}}}{\tilde{z}_{12}^{1,twtt}} \frac{p_{y_{12}}}{\tilde{z}_{12}^{1,twtt}} \frac{p_{z_{12}}}{\tilde{z}_{12}^{1,twtt}}\right]$$

$$H(2,10:12) = \frac{\partial \tilde{z}_{13}^{1,twtt}}{\partial \bar{X}_{rel}^i} = \left[\frac{p_{x_{13}}}{\tilde{z}_{13}^{1,twtt}} \frac{p_{y_{13}}}{\tilde{z}_{13}^{1,twtt}} \frac{p_{z_{13}}}{\tilde{z}_{13}^{1,twtt}}\right]$$

$$H(3,19:21) = \frac{\partial \tilde{z}_{14}^{1,twtt}}{\partial \bar{X}_{rel}^i} = \left[\frac{p_{x_{14}}}{\tilde{z}_{14}^{1,twtt}} \frac{p_{y_{14}}}{\tilde{z}_{14}^{1,twtt}} \frac{p_{z_{14}}}{\tilde{z}_{14}^{1,twtt}}\right]$$

$$H(4,10:12) = \frac{\partial \tilde{z}_{23}^{1,twtt}}{\partial \bar{X}_{rel}^i} = \left[\frac{p_{x_{13}}-p_{x_{12}}}{\tilde{z}_{23}^{1,twtt}} \frac{p_{y_{13}}-p_{y_{12}}}{\tilde{z}_{23}^{1,twtt}} \frac{p_{z_{13}}-p_{z_{12}}}{\tilde{z}_{23}^{1,twtt}}\right]$$

$$H(4,1:3) = -H(4,10:12)$$

$$H(5,19:21) = \frac{\partial \tilde{z}_{24}^{1,twtt}}{\partial \bar{X}_{rel}^i} = \left[\frac{p_{x_{14}}-p_{x_{12}}}{\tilde{z}_{24}^{1,twtt}} \frac{p_{y_{14}}-p_{y_{12}}}{\tilde{z}_{24}^{1,twtt}} \frac{p_{z_{14}}-p_{z_{12}}}{\tilde{z}_{24}^{1,twtt}}\right]$$

$$H(5,1:3) = H(5,19:21)$$

$$H(6,19:21) = \frac{\partial \tilde{z}_{34}^{1,twtt}}{\partial \bar{X}_{rel}^i} = \left[\frac{p_{x_{14}}-p_{x_{13}}}{\tilde{z}_{34}^{1,twtt}} \frac{p_{y_{14}}-p_{y_{13}}}{\tilde{z}_{34}^{1,twtt}} \frac{p_{z_{14}}-p_{z_{13}}}{\tilde{z}_{34}^{1,twtt}}\right]$$

$$H(6,10:12) = -H(6,19:21)$$

$$H(7,1:3) = \frac{\partial \tilde{z}_{12}^{1,relbaro}}{\partial \bar{X}_{rel}^i} = -\text{uv\_body2nav\_vert}'$$

$$H(8,10:12) = \frac{\partial \tilde{z}_{13}^{1,relbaro}}{\partial \bar{X}_{rel}^i} = \text{uv\_body2nav\_vert}'$$

$$H(9,19:21) = \frac{\partial \tilde{z}_{14}^{1,relbaro}}{\partial \bar{X}_{rel}^i} = -\text{uv\_body2nav\_vert}'$$

where v_body2nav_vert=$C_n^{b1}(:,3)$.

(A.1.8)

Strapdown—Relative Translation

In embodiments, relative translation and rotation of a mobile platform 102 (e.g., the movement and rotation of the mobile platform relative to pitch, roll, and yaw axes (e.g., x-, y-, and z-axes) may be expressed via strapdown equations similar to those used in head-tracking systems. For example, relative strapdown processing 304 and Kalman filters incorporated thereby may generate estimates of the position and orientation of a remote platform y relative to an ownship reference frame x (e.g., of the key mobile platform 102) by propagating rates and accelerations of estimated pose data of the remote platform and ownship into the strapdown equation $$r_{y/i} = r_{x/i} r_{y/x} \quad (A.2.1)$$

such that the head pose $r_{y/i}$ in any inertial reference frame i is a function of the relative position $r_{y/x}$ expressed in the ownship reference frame x and the ownship position $r_{x/i}$ in the inertial reference frame i. For example, the above equation may be used to predict a relative acceleration $\ddot{r}_{y/x}$ corresponding to an estimated remote platform pose relative to the ownship reference frame x and projected forward in time.

By way of a non-limiting example, differentiating with respect to time twice in the inertial space:

$$D_i^2 r_{y/i} = D_i^2 r_x + D_i^2(r_{y/x}) \quad (A.2.2)$$

$$= D_i^2 r_{x/i} + D_i^2(\dot{r}_{y/x}^x + \omega_{x/i}^x \times r_{y/x}^x) \quad (A.2.3)$$

$$= D_i^2 r_{x/i} + D_i \dot{r}_{y/x}^x + D_i(\omega_{x/i}^x r_{y/x}^x) \quad (A.2.4)$$

$$= D_i^2 r_{x/i} + \ddot{r}_{y/x}^x + \omega_{x/i}^x \times r_{y/x}^x + (D_i + \omega_{x/i}^x \times)(\omega_{x/i}^x \times r_{y/x}^x) \quad (A.2.5)$$

$$= D_i^2 r_{x/i} + \ddot{r}_{y/b}^x + \omega_{x/i}^x \times \dot{r}_{y/b}^x + \dot{\omega}_{x/i}^x \times r_{y/x}^x + \omega_{x/i}^x \times \dot{r}_{y/x}^x + \omega_{x/i}^x \times (\omega_{x/i}^x \times r_{y/x}^x) \quad (A.2.6)$$

$$= D_i^2 r_{x/i} + \ddot{r}_{y/x}^x + \dot{\omega}_{x/i}^x \times r_{y/x}^x + 2(\omega_{x/i}^x \times \dot{r}_{y/x}^x) + \omega_{x/i}^x \times (\omega_{x/i}^x \times r_{y/x}^x) \quad (A.2.7)$$

In embodiments, the above equations hold for any arbitrary reference frame, so in the ownship reference frame x:

$$D_i^2 r_{y/i} = C_y^x f_{y/i}^y + C_x^y g_m^y \quad (A.2.8)$$

$$D_i^2 r_x = f_{x/i}^x + g_m^x \quad (A.2.9)$$

and, substituting equations A.2.8 and A.2.9 into A.2.7:

$$c_x^y(f_{y/i}^y + g_m^y) = f_{x/i}^x + g_m^x + \ddot{r}_{y/x}^x + \dot{\omega}_{x/i}^x + r_{y/x}^x + 2(\omega_{x/i}^x \times \dot{r}_{y/x}^x) + \omega_{x/i}^x \times (\omega_{x/i}^x \times r_{y/x}^x) \quad (A.2.10)$$

$$\ddot{r}_{y/x}^x = C_y^x f_{y/i}^y - \dot{\omega}_{x/i}^x \times r_{y/x}^x - 2(\omega_{x/i}^x \times \dot{r}_{y/x}^x) - \omega_{x/i}^x \times (\omega_{x/i}^x \times r_{y/x}^x) - f_{x/i}^x + g_m^x - C_x^y g_m^y \quad (A.2.11)$$

With respect to the equation A.2.11 above, every term is either a relative inertial state (e.g., position/velocity/attitude (PVA) or orientation) or directly measured by the IMU of the mobile platform 102 (e.g., sensed angular rates or accelerations relative to a global or earth-centered inertial (ECI) reference frame), apart from the final two terms $g_m^b - C_n^b g_m^h$, which are functions of gravity. For example, assuming a simple plumb-bob gravitational model, e.g., where gravity g is a function of latitude and altitude, any error introduced into equation A.2.11 above may be bounded. With respect to either cooperative PNT generally or to a headtracking model as referenced above, the table below may be considered a worst-case assumption of the variable effect of gravity upon two IMUs (e.g., aboard two different mobile platforms 102, 102*a-c*) based on differences in position and/or altitude. For example, position knowledge accurate to even 1 km would allow for a more accurate estimate of $\|g_m^x - C_y^x g_m^y\|$ than is provided below for all but the first case (for reference, changes in latitude away from the equator approximate position changes to the north, e.g.: 0.01°≈6.3 km, 0.1°≈63 km, 1° 6.3 km). Assuming an ownship IMU (e.g., reference frame x) at zero latitude, zero longitude, and zero altitude (0 m), the difference in gravity sensed by an IMU at the given position and altitude may be:

TABLE A.2.1

| LAT (deg) | LONG (deg) | ALT (m) | $\|g_m^x - C_y^x g_m^y\|$ (m/s²) |
|---|---|---|---|
| 0 | 0 | 1,000 | 0.0031 |
| 0 | 0 | 10,000 | 0.031 |
| 0 | 0.01 | 0 | 0.0000052 |
| 0 | 0.1 | 0 | 0.00052 |
| 0 | 1 | 0 | 0.0368 |
| 0 | 1 | 10,000 | 0.0061 |

Strapdown—Relative Rotation

In embodiments, the time rate of change for a direction cosine matrix (DCM) from reference frame x to reference frame y may be expressed, where rotation vector w may be interpreted as a rotation of the y frame relative to the x frame, referenced in the y frame:

$$\dot{C}_y^x = C_y^x[\omega_{y/x}^y \times] \quad (A.3.1)$$

$$[\omega \times] = \begin{bmatrix} 0 & -\omega_x & \omega_y \\ \omega_x & 0 & -\omega_z \\ -\omega_y & \omega_z & 0 \end{bmatrix} \quad (A.3.2)$$

And incorporating the additive property of angular velocities:

$$\omega_{y/i}^y = \omega_{y/x}^y + \omega_{x/i}^y \quad (A.3.3)$$

$$= \omega_{y/x}^y + C_x^y \omega_{x/i}^x \quad (A.3.4)$$

$$\omega_{y/x}^y = \omega_{y/i}^y - C_x^y \omega_{x/i}^x \quad (A.3.5)$$

Substituting equation A.3.5 into equation A.3.1 may result in the following relationships:

$$\dot{C}_y^x = C_y^x[(\omega_{y/i}^y - C_x^y \omega_{x/i}^x) \times] \quad (A.3.6)$$

$$= C_y^x[\omega_{y/i}^y \times] - C_y^x[C_x^y \omega_{x/i}^x \times] \quad (A.3.7)$$

$$= C_y^x[\omega_{y/i}^y \times] - C_y^x C_x^y[\omega_{x/i}^x \times]C_y^x \quad (A.3.8)$$

$$= C_y^x[\omega_{y/i}^y \times] - [\omega_{x/i}^x \times]C_y^x \quad (A.3.9)$$

$$[\omega_{y/x}^y \times] = [\omega_{y/i}^y \times] - C_x^y[\omega_{x/i}^y \times]C_y^x \quad (A.3.10)$$

In embodiments, the equivalent form of equation (A.3.9) above may be expressed in quaternion rotations:

$$\dot{q}_y^x = \frac{1}{2}\Omega(\omega_{y/x}^y)q_y^x \quad (A.3.11)$$

$$\Omega = \begin{bmatrix} 0 & \omega_z & \omega_y & \omega_x \\ -\omega_z & 0 & \omega_x & \omega_y \\ -\omega_y & -\omega_x & 0 & \omega_z \\ -\omega_x & -\omega_y & -\omega_z & 0 \end{bmatrix} \quad (A.3.12)$$

Figure 4A:
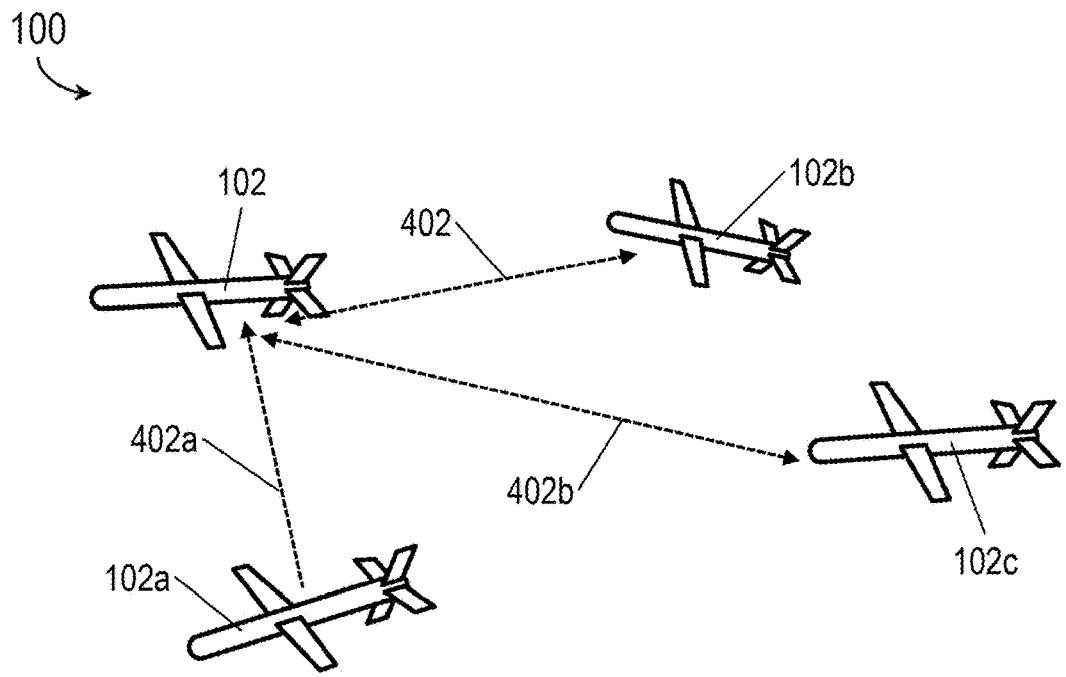
FIGS. 4A and 4B illustrate ranging operations of the network of FIG. 1.
Figure 4B:
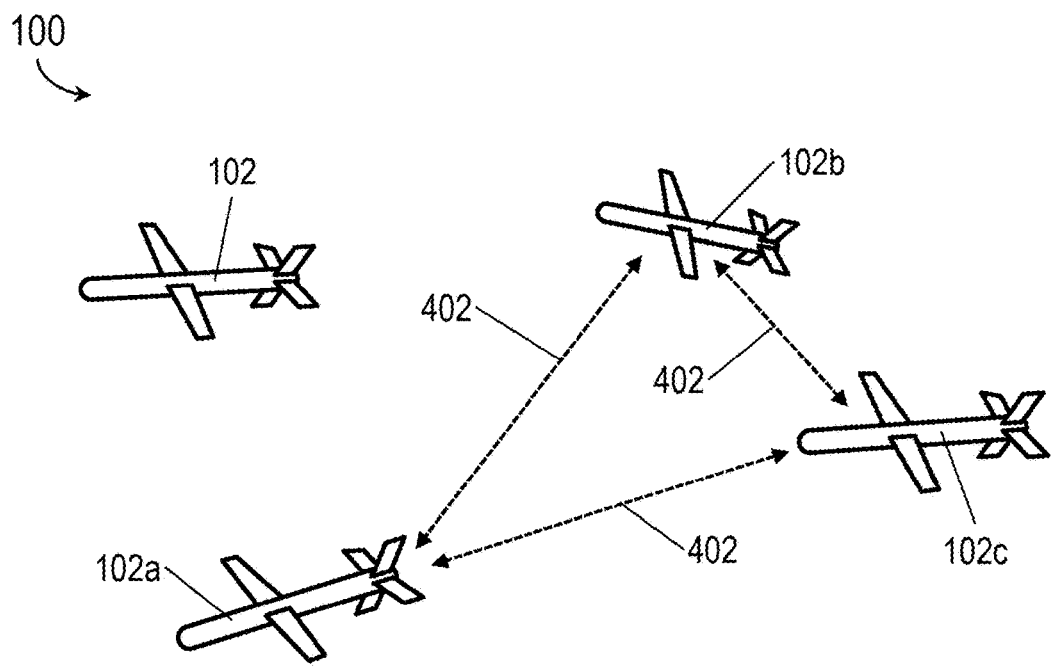

Referring also to FIGS. 4A and 4B, from the perspective of any mobile platform 102 of the network of N mutually connected mobile platforms 102, 102*a-n* (e.g., where N≥4), ranging data (e.g., one-way pseudoranging and/or bidirectional TWIT ranging) may be characterized in terms of primary ranging data and secondary ranging data.

In embodiments, referring to FIG. 4A, the mobile platform 102 may generate primary ranging data 402 (e.g., pseudoranging via receiving timing signals 402*a* and/or performing bidirectional TWIT ranging 402*b* as shown by, e.g., FIG. 2) between itself and each neighboring mobile platform 102*a*-*c*. For example, if N=4, the mobile platform 102 may generate (N−1) or 3 sets of primary ranging data.

Once primary ranging data has been generated for each pairing of the mobile platform 102 with a neighboring mobile platform 102*a*-*c*, the mobile platform 102 may (e.g., via data link 104, FIG. 1) distribute its primary ranging data to each of the neighboring mobile platforms 102*a*-*c*.

In embodiments, referring now to FIG. 4B, secondary pseudoranging data may be concurrently generated by the neighboring mobile platforms 102*a*-*c*. For example, (N−1) sets of secondary pseudoranging data may be generated via ranging 402, or one set of secondary ranging data for each respective ranging 402 between a unique pair of neighboring mobile platforms excluding the mobile platform 102 (e.g., 102*a*-102*b*, 102*a*-102*c*, 102*b*-102*c*, such that the ranging data is primary ranging data from the perspective of either participating mobile platform). Each set of secondary ranging data may similarly be distributed throughout the network 100 (e.g., by either participating mobile platform) and may thereby be received by the mobile platform 102 for relative measurement processing (306, FIG. 3).

Figure 5:
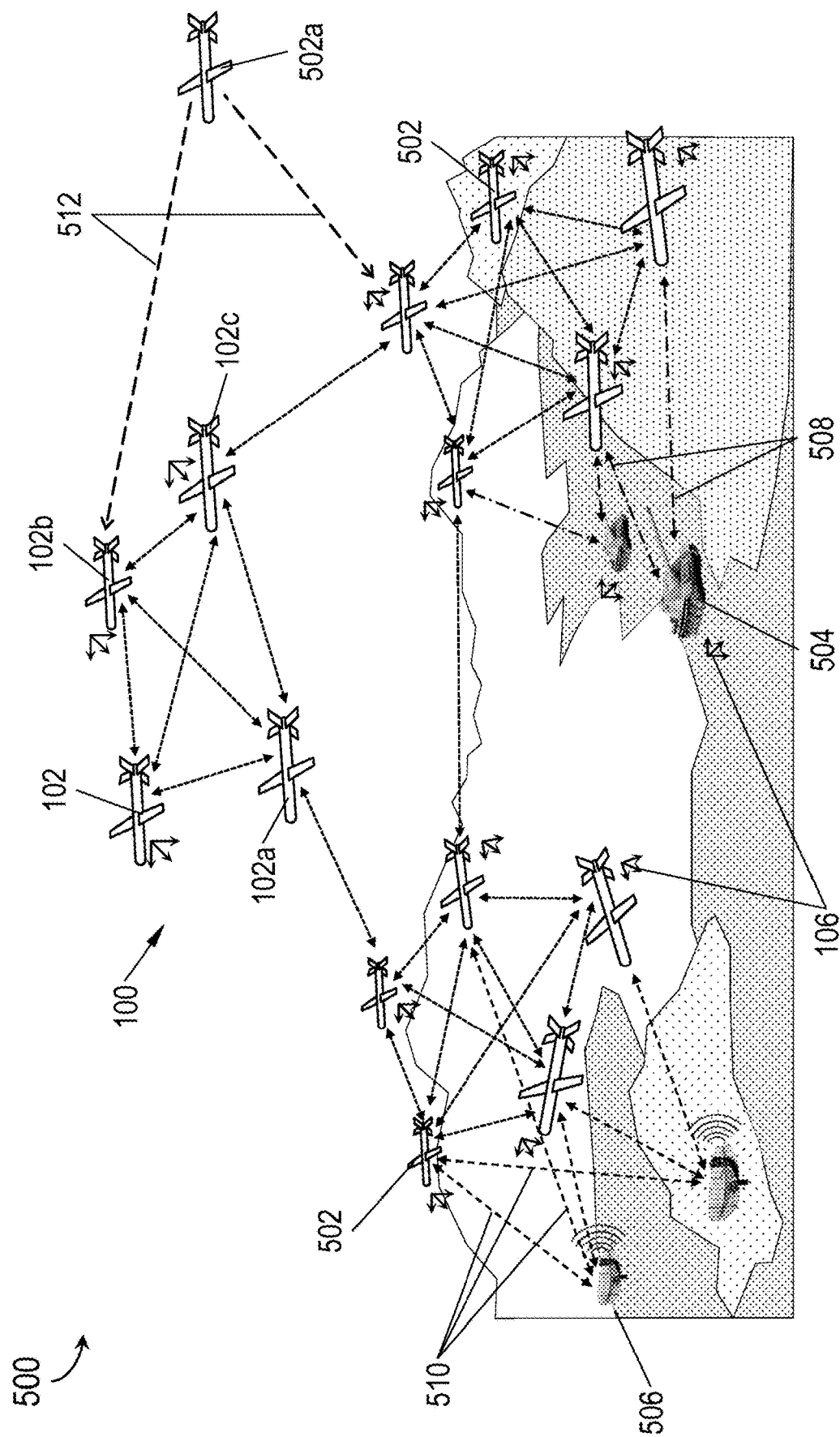
FIG. 5 illustrates an operating environment of the network of FIG. 1.

Referring now to FIG. 5, the operating environment 500 is disclosed. The operating environment, e.g., an environment within which the network 100 may operate, may further include additional airborne mobile platforms 502, ground-based mobile platforms 504, and ground stations 506. It may be noted that not every platform within the operating environment 500 may be in contact with every other platform (e.g., via data link, communications link, etc.). It may further be noted that not every data link, communications link, or other like connection between two platforms within the operating environment 500 may be bidirectional.

In embodiments, the network 100 may maintain the precise relative 6DOF PNT navigation solution (312, FIG. 3) across its component or member mobile platforms 102, 102*a*-*c* for extended periods across GPS-denied or other contested environments. Other mobile platforms within the operating environment 500 may establish contact with, or even join, the network 100.

In embodiments, the airborne mobile platforms 502, ground-based mobile platforms 504, and ground stations 506 may exchange position and navigation information by ranging 402 (e.g., one-way pseudoranging and/or TWIT) or via other sensing/ranging means as available, e.g., EO/IR line of sight 508 (e.g., with or without ranging), passive RF time of arrival 510 (TOA), or TWIT incorporating absolute PNT 512. For example, the network 100 may fully or partially pass out of a GPS-denied area such that one or more member mobile platforms 102*b*-*c* may participate in ranging via TWIT incorporating absolute PNT 512, e.g., received from an advantaged node (airborne mobile platform 502*a*) external to the network 100.

Referring to FIG. 6A, the network 100 of mobile platforms 102, 102*a*-*c* is shown.

In embodiments, each of the mobile platforms 102, 102*a*-*c* may change position relative to the other platforms while each platform moves according to its own trajectory 602 between a first time of validity $TOV_N$ and a subsequent time of validity $TOV_{N+1}$ (e.g., where each time of validity is associated with a measurement of inertial states, a measurement of pressure altitude, and/or corrective ranging measurements between mobile platforms).

In embodiments, absolute position, navigation, and timing (PNT) at the key mobile platform 102 (e.g., an advantaged mobile platform), the precision relative PNT solution (312, FIG. 3) may fix the network 100 to position in a global reference frame, but with a degree of rotational ambiguity relative to the coordinate axes of each platform reference frame (see, e.g., the subsequent position and orientation 604 of the key mobile platform 102). Referring also to FIG. 6B, the network 100*a* may be implemented and may function similarly to the network 100, except that within the network 100*a* absolute PNT may also be assumed for the mobile platform 102*c* in addition to the key mobile platform 102. In embodiments, the mobile platform 102*c* may perform TWIT ranging with absolute PNT (606) with each neighboring mobile platform 102, 102*a*-*b*. Consequently, the precision relative PNT solution 312 may be refined into an absolute PNT solution distributable throughout the network 100*a* and fixing the network to position in the global reference frame while addressing any position or orientation ambiguity associated with the solution.

Figure 7A:
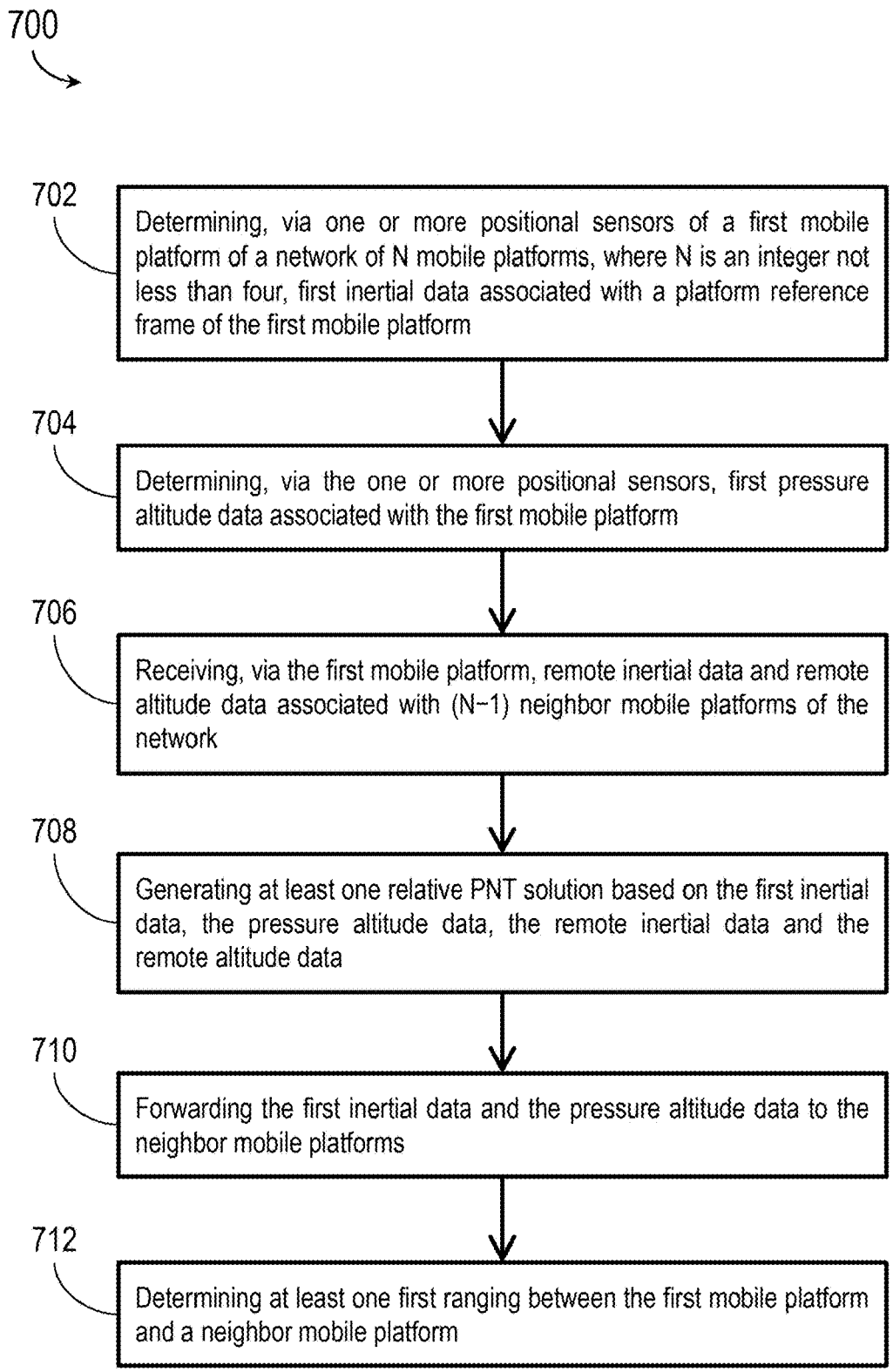
FIGS. 7A through 7C illustrate a method for maintaining relative precision position, navigation, and timing (PNT) across a network of mutually connected mobile platforms according to example embodiments of this disclosure.

Referring to FIG. 7A, the method 700 for maintaining precision position, navigation, and timing (PNT) across a network of mutually connected mobile platforms (e.g., a network of four or more mobile platforms) may be implemented via the network 100 and may include the following steps.

At a step 702, the positional sensors of a key mobile platform of the network determine inertial state data of the key mobile platform, the inertial state data fixed in a platform reference frame and referencing a particular time of validity (TOV).

At a step 704, barometric altimeter aboard the key mobile platform determines a pressure altitude of the mobile platform.

At a step 706, the key mobile platform receives inertial state data and pressure altitude data from the other neighboring mobile platforms of the network. For example, the inertial state data received from the other mobile platforms may reference the TOV of the ownship inertial state data sensed by the key mobile platform. For example, the key mobile platform may exchange inertial state data and pressure altitude data with the neighboring mobile platforms (see step 710) and generate updated relative PNT solutions (see step 708) at or near a particular data rate (e.g., 50 Hz) higher than that achieved for ranging data as described below.

At a step 708, the key mobile platform generates a relative PNT solution fixing itself and its neighbor mobile platforms in position and orientation, the relative PNT solution based on the sensed inertial and altitude data as well as the inertial and altitude data received from the neighboring mobile platforms. For example, the key mobile platform may be an advantaged node in that its position sensors include an absolute positioning system (e.g., GNS or other satellite-based navigational systems) capable of determining an absolute position of the key mobile platform, e.g., in an earth-centered/earth-fixed (ECEF) reference frame. The relative PNT solution may be based on an absolute position of the key mobile platform, and may fix the key mobile platform and its neighboring mobile platforms in the ECEF reference frame (e.g., allowing for a degree of rotational ambiguity).

At a step 710, the key mobile platform forwards its own inertial state and pressure altitude data to the neighboring mobile platforms.

At a step 712, the key mobile platform performs ranging between itself and each neighboring mobile platform. For examine, the key mobile platform may determine a range between itself and a neighboring mobile platform via one-way pseudoranging associated with receiving timing signals transmitted by the neighboring mobile platform, or via two-way time transfer (TWIT) performed by both mobile platforms.

Figure 7B:
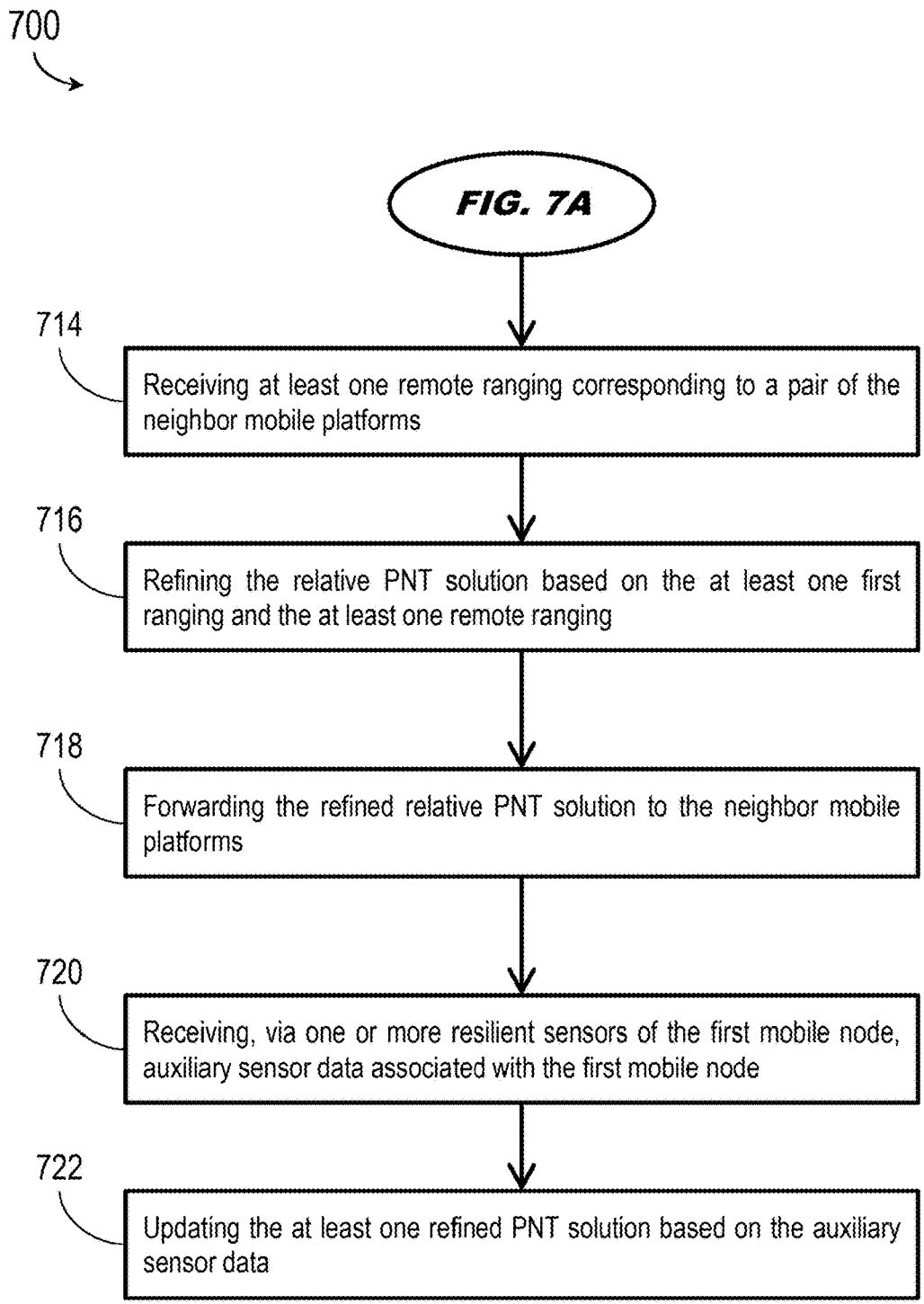

Referring also to FIG. 7B, at a step 714, the key mobile platform receives remote ranging data from the neighboring mobile platforms, each remote ranging corresponding to a pair of mobile platforms and a ranging between them. For example, the key mobile platform may exchange ranging data (likewise sending its own sensed ranging data) with the neighboring mobile platforms, and refine the relative PNT based on ranging data (see step 716) at a lower data rate (e.g., 1 Hz vs. 50 Hz) compared to the exchange of inertial and altitude data (see step 706; also the initial generation of relative PNT solutions, see step 708).

At a step 716, the key mobile platform refines the relative PNT solution based on the sensed and received ranging data.

At a step 718, the key mobile platform forwards the refined PNT solution to the neighboring mobile platforms of the network.

In some embodiments, the method 700 may include additional steps 720 and 722. At the step 720, the key mobile platform receives additional/auxiliary sensor data from onboard resilient sensors (e.g., electrooptical sensors, line of sight sensors, magnetometers, air data sensors).

At the step 722, the key mobile platform further updates the refined PNT solution (e.g., with enhanced accuracy) based on the auxiliary sensor data.

Figure 7C:
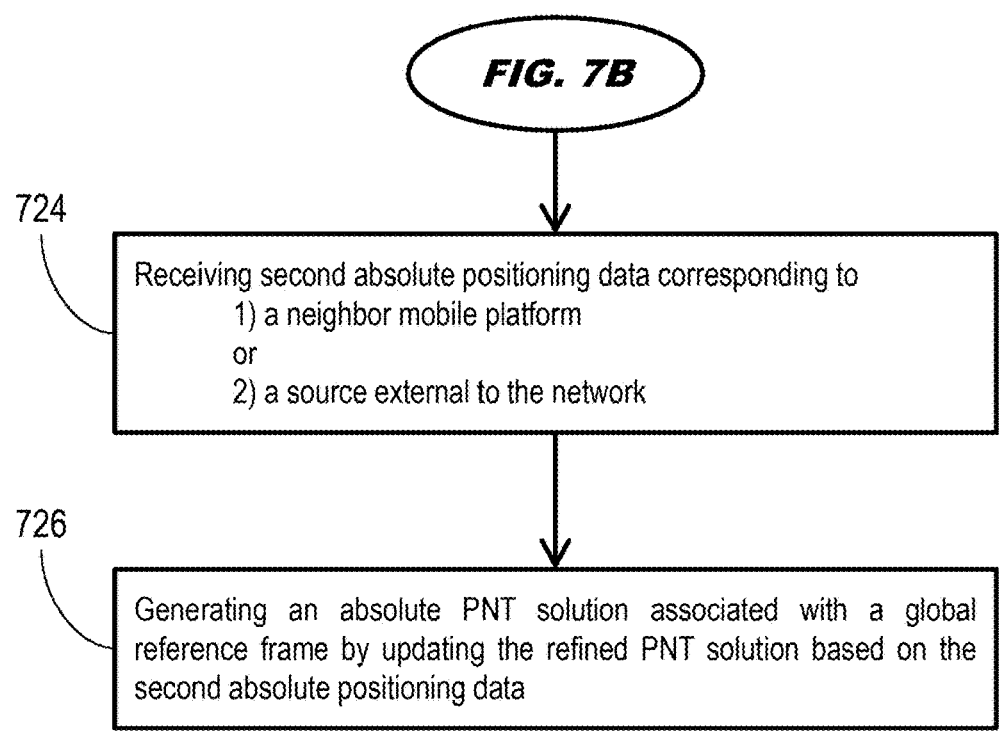

Referring also to FIG. 7C, the method 700 may include additional steps 724 and 726. At the step 724, if the key mobile platform is an advantaged node with absolute positioning, the key mobile platform receives additional absolute positioning data, e.g., from a source external to the network or from a neighboring mobile platform (e.g., a bearing to a neighboring advantaged node with its own absolute positioning).

At the step 726, the key mobile platform updates the relative PNT solution to an absolute PNT solution fixing the network in an ECEF or global reference frame (and resolving any rotational ambiguity associated with a single source of absolute position data).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A first mobile node of a network of N mutually connected mobile nodes, where N is an integer not less than four, the mobile node comprising:
    one or more positional sensors selected from a group including:
        a barometric altimeter configured to determine pressure altitude data corresponding to the first mobile node;
        an absolute position receiver configured to determine absolute position data of the first mobile node based on one or more received positioning signals;
        and
        an inertial measurement unit (IMU) configured to determine first inertial data of the first mobile node, the first inertial data associated with a platform reference frame;
    at least one network radio configured to establish a data link to each neighbor node of the N mobile nodes;
    and
    one or more processors coupled to the one or more positional sensors and to the at least one network radio, the one or more processors configured to:
        receive, from the one or more positional sensors, at least one of the first inertial data and the pressure altitude data;
        determine, via the network radio, at least one first ranging between the first mobile node and each neighbor node;
        receive, via the network radio and the data link:
        second inertial data and remote altitude data from each neighbor node;
        and
        at least one second ranging corresponding to each unique pair of neighbor nodes;
    and
    generate at least one relative position, navigation and timing (PNT) solution relative to the platform reference frame, the relative PNT solution associated with the absolute position data, the relative PNT solution based on:
        the first inertial data and the pressure altitude data of the first mobile node;
        and
        the second inertial data and the remote altitude data of each neighbor node.

2. The first mobile node of claim 1, wherein each of the N mutually connected neighbor nodes is selected from a group including:
    an airborne mobile platform;
    an unmanned aircraft system (UAS);
    a ground-based mobile platform;
    or
    a water-based mobile platform.

3. The first mobile node of claim 1, wherein the one or more processors are configured to distribute to each neighbor node via the network radio and data link one or more of:
    the relative PNT solution;
    the first inertial data;
    the pressure altitude data;
    or
    the at least one first ranging.

4. The first mobile node of claim 1, wherein the absolute position data is first absolute position data and:
    the network radio is configured to receive second absolute position data from at least one of a source external to the network or a neighbor node of the network;

and
the one or more processors are configured to update the relative PNT solution based on the second absolute position.

5. The first mobile node of claim 1, further comprising:
one or more resilient sensors configured to generate auxiliary sensor data, wherein the processors are configured to refine the relative PNT solution based on the auxiliary sensor data;
the one or more resilient sensors selected from a group including:
an electrooptical (EO) sensor configured to determine a relative bearing between the first mobile node and a bearing node of the (N−1) neighbor nodes;
a line of sight (LOS) sensor configured to determine a LOS angle between the first mobile node and at least one neighbor node;
a magnetometer;
or
an air data sensor.

6. The first mobile node of claim 5, wherein:
the relative bearing is based on absolute position data of the bearing node;
and
the one or more processors are further configured to generate at least one absolute PNT solution relative to a global reference frame, the absolute PNT solution based on one or more of:
the first inertial data and the pressure altitude data of the first mobile node;
the second inertial data and the remote altitude data of each neighbor node;
the at least one first ranging;
the at least one second ranging;
or
the relative bearing.

7. The first mobile node of claim 1, wherein the processors are configured to refine the relative PNT solution based on the at least one first ranging and the at least one second ranging.

8. The first mobile node of claim 1, wherein the processors are configured to:
receive the at least one second ranging and the remote altitude data at a first rate;
and
receive the first inertial data and the second inertial data at a second rate, the second rate faster than the first rate.

9. The first mobile node of claim 1, wherein the absolute position receiver includes a satellite-based position receiver configured to determine the absolute position data based on one or more received navigational signals.

10. The first mobile node of claim 1, wherein:
the at least one first ranging and the at least one second ranging are selected from a group including:
a one-way pseudoranging between the first mobile node and a neighbor node, the one-way pseudoranging based on at least one timing signal received by the first mobile node;
or
a bidirectional ranging between the first mobile node and a neighbor node, the bidirectional ranging determined via two-way time transfer (TWTT).

11. A method for maintaining a relative position, navigation, and timing (PNT) solution across a network of mobile platforms, the method comprising:
determining, via one or more positional sensors of a first mobile platform of a network of N mobile platforms, where N is an integer not less than four, first inertial data associated with a platform reference frame of the first mobile platform;
determining, via the one or more positional sensors, first pressure altitude data associated with the first mobile platform;
receiving, via the first mobile platform, remote inertial data and remote altitude data associated with (N−1) neighbor mobile platforms of the network;
generating at least one relative PNT solution based on the first inertial data, the pressure altitude data, the remote inertial data and the remote altitude data;
forwarding the first inertial data and the pressure altitude data to the neighbor mobile platforms;
determining at least one first ranging between the first mobile platform and a neighbor mobile platform;
receiving at least one remote ranging corresponding to a pair of the neighbor mobile platforms;
refining the relative PNT solution based on the at least one first ranging and the at least one remote ranging;
and
forwarding the refined relative PNT solution to the neighbor mobile platforms.

12. The method of claim 11, wherein:
determining at least one first ranging between the first mobile platform and a neighbor mobile platform includes performing two-way time transfer (TWTT) between the first mobile platform and the neighbor mobile platform;
and
receiving at least one remote ranging corresponding to a pair of the neighbor mobile platforms includes receiving at least one remote ranging corresponding to a two-way time transfer (TWTT) between the pair of neighbor mobile platforms.

13. The method of claim 11, wherein:
receiving, via the first mobile platform, remote inertial data and remote altitude data associated with (N−1) neighbor mobile platforms of the network includes receiving the remote inertial data and the remote altitude data at a first data rate;
and
receiving at least one remote ranging corresponding to a pair of the neighbor mobile platforms includes receiving the at least one remote ranging at a second data rate, the first data rate higher than the second data rate.

14. The method of claim 11, wherein:
the one or more positional sensors include an absolute positioning system configured to determine first absolute positioning data of the first mobile platform;
the at least one relative PNT solution is based on the first absolute positioning data;
further comprising:
receiving second absolute positioning data corresponding to 1) a neighbor mobile platform or 2) a source external to the network;
and
generating an absolute PNT solution associated with a global reference frame by updating the refined PNT solution based on the second absolute positioning data.

15. The method of claim 11, further comprising:
receiving, via one or more resilient sensors of the first mobile platform, auxiliary sensor data associated with the first mobile platform;

and
updating the at least one refined PNT solution based on the auxiliary sensor data.

\* \* \* \* \*